United States Patent [19]

Pongracz

[11] 4,277,731
[45] Jul. 7, 1981

[54] WRAPPING MACHINE

[75] Inventor: Endre Pongrácz, Ecublens, Switzerland

[73] Assignee: SAPAL Société Anonyme des Plieuses Automatiques, Switzerland

[21] Appl. No.: 933,913

[22] Filed: Aug. 15, 1978

[30] Foreign Application Priority Data

Sep. 7, 1977 [CH] Switzerland ............... 10976/77

[51] Int. Cl.³ .......................................... G05B 19/40
[52] U.S. Cl. ................................ 318/685; 318/562; 318/640; 53/203
[58] Field of Search ............... 318/685, 625, 562, 640; 53/203

[56] References Cited

U.S. PATENT DOCUMENTS

| 3,614,576 | 10/1971 | Raphael | 318/625 |
| 3,974,432 | 8/1976 | Thompson | 318/625 X |
| 4,006,395 | 2/1977 | Reesen | 318/625 X |
| 4,055,786 | 10/1977 | DiMarzio | 318/562 |

Primary Examiner—B. Dobeck
Attorney, Agent, or Firm—Stevens, Davis, Miller & Mosher

[57] ABSTRACT

A wrapping machine has a plurality of movable elements which move in predetermined ways to perform a wrapping operation. Control of the movements of at least some of the elements is performed using a pulse generator for synchronization and a control circuit which receives the pulses from the pulse generator. The control circuit comprises a computer having a suitable working program and peripherals connected to the computer and operating the associated element. Each peripheral comprises a processor controlled by the computer and a step-by-step motor which is controlled by the processor and which is operatively connected to the associated element to move the element.

12 Claims, 5 Drawing Figures

WRAPPING MACHINE

The present invention relates to wrapping machines.

Such machines are used, for example, to effect, at a high rate, the individual wrapping of slabs of chocolate or other products of similar form.

A known wrapping machine comprises a plurality of movable elements actuated by a camshaft, the program for movement of the elements corresponding to a given task being incorporated in the structure and the arrangement of the cams. Associated with each cam are different transmission parts such as levers, pull handles etc. and, optionally, means for manual control of the movements of the elements.

The known machine with mechanical cams has numerous disadvantages such as:

modification of the desired movement of the elements necessitates a manual control by a qualified operator, modification of the initial position of the movement (i.e. the setting of relative zero of the movement) likewise requires an operator's valuable time, modification of the beginning of the movement in relation to the absolute zero or start of the cycle of the machine requires the shifting and the repinning of the cam, modification of the kinematics of the movement or of the angle required for the execution of the movement necessitates the manufacture of a new cam, modification of the program of a movement from one cycle to another of the machine (for example the locking of the movement under certain conditions) is only possible with a special expensive construction, replacement of a cam requires considerable time, cams of high-speed machines require continuous lubrication (e.g. oil baths), great inertia of the camshaft loaded with cams renders the instantaneous stopping of a movement impossible, if for example the machine needs to be stopped for safety reasons, the distance between the working tool (for example a folder element) and the cam is often great and necessitates a considerable number of machine elements, which increases the probability of a mechanical breakdown, the addition of new functions to an existing machine, i.e. new functions for which no provision was made when the machine was created is often impossible because of design problems, and the construction of a new machine takes a long time because it is necessary to construct the frame with the camshaft and the oil bath each time.

The above-mentioned disadvantages are particularly onorous when the machine is an adjustable, universal machine which often undergoes a change of format during its use.

One way of overcoming the above disadvantages is to replace the mechanical cams by electronic cam followers. In this case each movement has an individual drive controlled by the signal originating from an electronic cam follower. Nevertheless, there are still disadvantages, such as:

adjustments are delicate because of the use of analogue signals, although their digitalization is possible provided that there is additional equipment, modification of the kinematics of the movement or of the angle required for the execution of the movement necessitates the manufacture of a new cam, the initial positioning and the maintenance of the position of the relative zero with a control system requires expensive position pick-offs.

Another approach to eliminate the disadvantages of mechanical cams resides in the use of digital control for the programming of a movement with an individual drive. Examples are found in two fields, namely machines having tools with numerical control, and Industrial robots with numerical control. In both fields, the following common characteristics are found:

(a) the number of movements is limited,
(b) the kinematics of the movements are simple,
(c) the accelerations are low,
(d) the movements do not overlap,
(e) the speed of the machine is fixed (there may possibly be a second or third speed).

That approach is not applicable to high-speed wrapping machines which have the following characteristics:

(a) large number of movements,
(b) variable kinematics,
(c) high acceleration (of the order of 5 g, for example),
(d) overlapping movements, and
(e) variable speed over the whole range which extends from 0 to 100% of the maximum speed (of the order of 1.5 m/sec., for example).

One object of the invention is to overcome one or more of the above-mentioned disadvantages of wrapping machines with cams or electronic cam followers.

Another object is to provide a wrapping machine which is very flexible in its application and very convenient to use.

Yet another object is to provide a machine which is capable of working at high rates, with acceptable production and maintenance costs, and in which modifications and adaptations are easy to effect.

In accordance with the present invention, their is provided a wrapping machine comprising a plurality of movable elements and control means for controlling the movements of said elements, wherein said control means comprise a first pulse generator for synchronization, and a control circuit receiving pulses from said pulse generator, said control circuit including a computer, the store of which contains at least one working program, peripherals connected to the computer each comprising a processor controlled by the computer, and step-by-step motor means controlled by the processor and operable to actuate each one of said elements.

Such a machine lends itself well to a hybrid construction comprising on the one hand mechanical cams controlled by a main shaft, or electronic cam followers controlled by a camshaft rigidly connected to a main shaft, as in the machines of the prior art and, on the other hand, the means provided in the present invention. In this case, the synchronization at the level of the control is ensured by connecting the pulse generator to the shaft, the pulse generator being adapted in such a manner as to emit pulses at a frequency proportional to the speed of rotation of the shaft.

By analogy, the control circuit, with the computer, plays the part of the camshaft and the peripheral plays the part of the cam. The pulse generator, which may consist of a synchronization clock, plays a part similar to the drive of the conventional camshaft.

In one embodiment of the invention described in detail below, the control circuit comprises a microcomputer which directs the cycle of the machine. The store of the computer contains the sequence of individual movements in the form of a program. The computer transmits the movement instruction to the selected peripheral, at the required moment in the cycle of the machine, as well as the start pulse for the execution of this movement. Each peripheral is composed of a drive comprising a step-by-step motor, with its autonomous control, and a high speed processor which produces a pulse train for the control of the step-by-step motor, depending on the parameters received from the controller of the system. The high-speed processor uses a central speed reference originating either from an oscillator or from a rotary pulse generator driven by the master motor. Moreover, each peripheral comprises a pulse generator, keyed onto its motor, to monitor the execution of the task and a slot-type initiator to be able to define the absolute zero of the movement.

A wrapping machine in accordance with the invention having a plurality of movable elements and control means for controlling movement of the elements will now be described, by way of example, with reference to the accompanying drawings, in which.

The description given below relates to an experimental hybrid machine, which is suitable in applications where it is desired not to sacrifice the whole of the control of a known machine but it is desired to improve the control. The description will refer more particularly to a prototype on which the flexibility of use obtained has been tested, as has its excellent compatibility with the known mechanisms.

Figure 1:
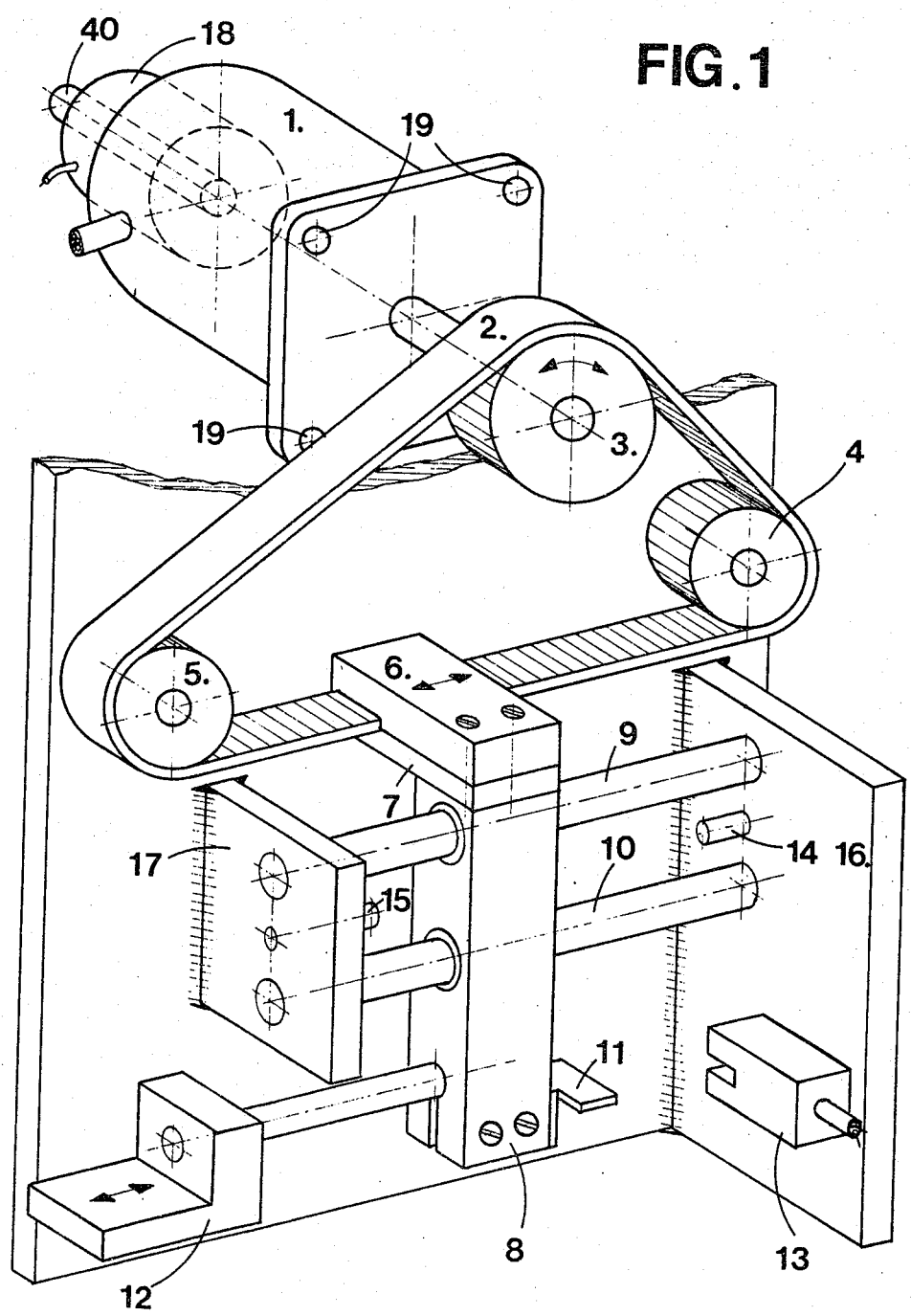
FIG. 1 illustrates a mechanical part of a peripheral of the control means.

FIG. 1 shows a peripheral for executing linear movement using a rotary step-by-step motor 1 which is anchored on the frame of the machine (not illustrated in the Figure) by four screws engaged in the holes 19. The motor 1 drives a serrated belt 2 by means of a wheel 3, the belt 2 passing over a guide wheel 4 and over a tensioner 5. Three teeth of a horizontal portion of the belt are gripped between a gripping members 6 and 7. The members 6 and 7 are fixed to a slide 8 of a linearly movable assembly. The slide 8 moves on guides 9 and 10 anchored in rear and front walls 16 and 17 which are fixed to the frame of the machine. The slide 8 carries a working tool or element 12.

When the slide moves to its rear most position, a flag 11, fixed to the slide 8, enters a slot provided on a photoelectric detection device 13, the signal of which is used by a computer 20 (FIG. 3) when it starts the machine, as will be fully described below. The device 13, hereinafter called a "slot-type initiator", is fixed to the rear wall. A rear stop 14 prevents the flag 11 from leaving the slot and limits the rearward linear travel and a front stop 15 limits the forward linear travel.

The motor 1 has an additional stub axle 40 at the end opposite the drive wheel 3. This additional stub axle 40 carries the rotor of an incremental generator 18, the stator of the generator 18 being fixed to the end plate of the motor. The generator 18 has two channels enabling the direction of rotation to be identified.

By way of indication, it may be specified that, for the prototype, a step-by-step motor model 21-4288 D 200 of the mark Sigma Instruments Inc, was used in which 200 steps are equivalent to one revolution. The incremental generator selected was the model Trim-Step of the mark Trump-Ross and has 200 lines per revolution, these lines being disposed axially on a cylindrical surface, in such a manner as to eliminate the disadvantage of an axial play. The high-speed processor used for the peripheral was of the type RCA CDP 1802 "COSMAC" equipped with two stores INTEL 1702A which are PROMs which can be cleared and reprogrammed with 256 bits. Of course, there are many other products which it is easy for one skilled in the art to select depending on his preference or his particular needs.

Figure 2:
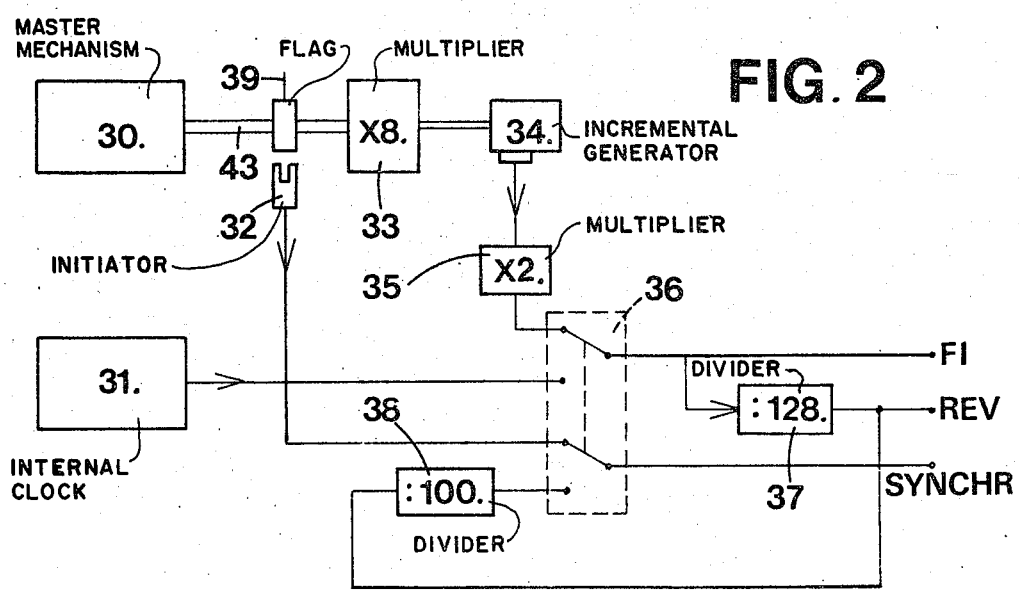
FIG. 2 illustrates the principle of generation of the signals FI, REV and SYNCHR of the control means.

FIG. 2 shows diagrammatically one example of generation of the signals SYNCHR, FI and REV from a master mechanism 30. A rotating output shaft 43 of the master mechanism 30 drives a flag 39. Once during each cycle of the machine, the flag enters the slot of a slot-type initiator 32. The output signal of the initiator 32 passes through an electronic switch 36 when the latter is in the illustrated position and forms the signal SYNCHR. The shaft 43 drives a mechanical multiplier 8 times 33, and an output shaft 44 of the multiplier 33 drives a rotor of a rotary incremental generator 34 at an angular speed 8 times higher than that of the output shaft 43.

The output signal of the generator 34 passes through an electronic frequency doubler 35 and the electronic switch 36 when the latter is in the illustrated position. The signal FI thus obtained is only periodic pulses, the frequency of which is proportional to the speed of the mechanism 30. When the shaft 43 rotates at a speed of 300 revolutions/minute, the frequency FI is equal to 64 KHz. The signal REV is obtained by the electronic divider 37 which divides by 128. At 300 revolutions/minute of the mechanism 30, the frequency REV is equal to 500 Hz. The electronic switch 36 enables pulses to be supplied even if the shaft 43 of the master machine 30 is not rotating. When the switch is placed in its other position, an internal clock 31 produces the signal FI and the signal SYNCHR is derived from the signal REV by an electronic divider 38, which divides by 100.

By way of example, it may be specified that the incremental generator 34 used for the prototype machine was the model Rotaswitch of the mark Disc Instruments Inc, comprising 800 radial lines on a disc. The mechanical multiplier 33 and the electronic doubler 35 enable the results to be simulated which would have been obtained with an incremental generator having a resolution 16 times higher. Tests have shown that it is thus possible, in certain circumstances, to avoid the high expense of an incremental generator with a very high resolution.

Figure 3:
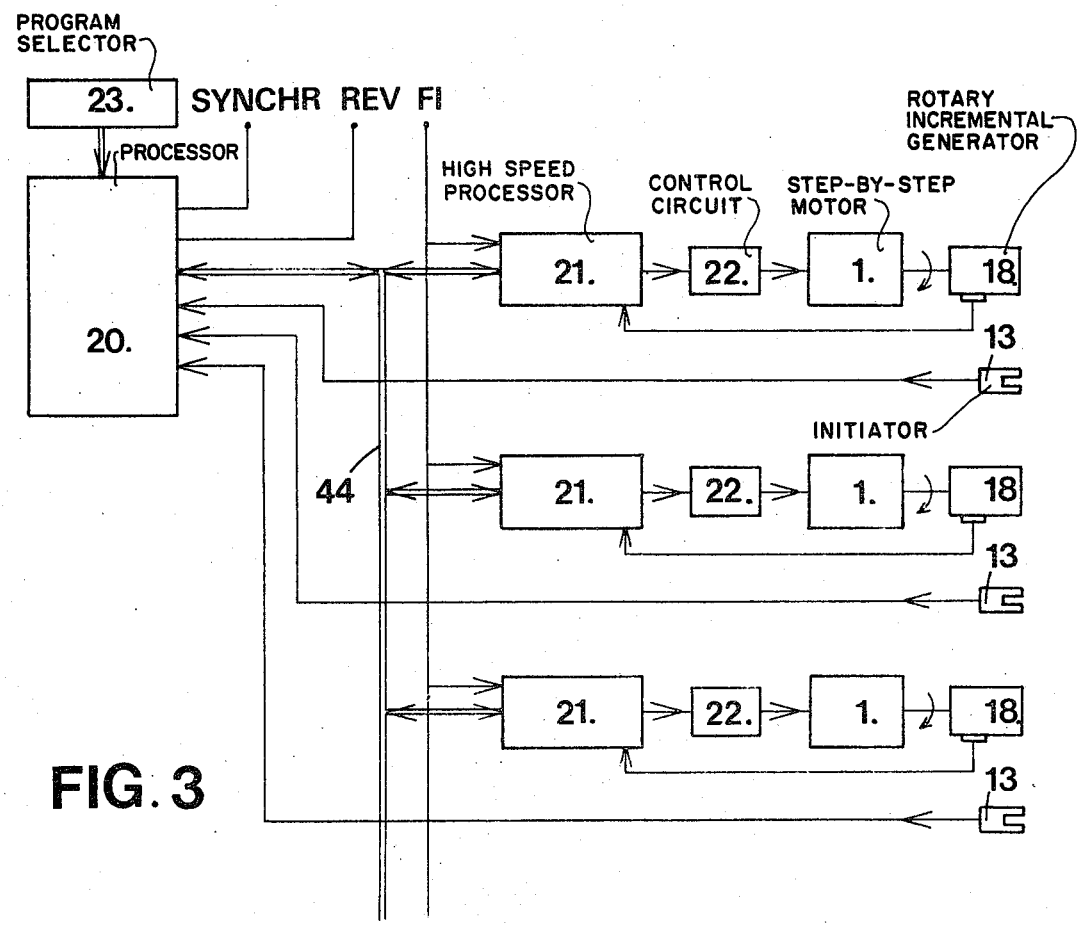
FIG. 3 is a diagrammatic representation of part of the control means.

FIG. 3 illustrates diagrammatically the control electronics. For the computer 20 of the above-mentioned prototype, an INTEL 8085 processor was used equipped with PROM stores which could be cleared and reprogrammed INTEL 1702 A-2. Of course, there are many other products which could serve the same purpose. The computer 20 stores several programs and the selection is effected by means of a program selector 23. This selector may consist of a control panel of the type comprised by certain micro- or mini-computers. Of course, the computer may be equipped with a control panel which is as sophisticated as desired. The computer 20, hereinafter called the controller of the system, receives the signals SYNCHR and REV. The controller of the system transmits by means of a bus 44 the individual orders to each high-speed processor 21. The high-speed processors 21 receive the common signal FI which enables them to calculate the intervals in the pulse train transmitted to the control circuit 22 of the step-by-step motor 1 depending on the program assigned by the controller of the system and the speed of the machine. Associated with each step-by-step motor 1 is the rotary incremental generator 18 and the slot-type initiator 13. The signal of the slot-type initiator is directly connected to the input of the controller of the system, while the two-phase output signals of the rotary incremental generator 18 are treated in the high-speed processor 21 which requests the intervention of the controller of the system in the event of non-execution.

Operation

1. Initialisation

In order that the system may recognize the permissible state of the machine for starting, each linearly movable assembly should be taken to the rear stop 14 where the flag 11 is in the slot of the initiator 13. The master mechanism 30 should be in a neutral position in which the flag 39 is in the slot of the initiator 32. The program selector 23 should be set in the position which corresponds to the required program of the machine. A position of the selector 23 represents an option with regard to the following variables:

setting (relative zero) of each individual movement,
order of the operations in the cycle of the work of the machine,
angle assigned for the execution of each operation,
direction of each individual movement,
kinematics of each individual movement.

If the conditions for starting the machine are combined after the START pulse, the setting of the movements is effected in accordance with the following scheme. The step-by-step motor 1 receives the pulses at a fixed frequency of the signal REV derived from the signal of the internal clock 31. The slide 8 is displaced forwards on the guides 9 and 10 at a constant speed. The flag 11 arrives in the position where the output signal of the slot-type initiator 13 changes over from 1 to 0. This position is defined as the absolute zero of the movement. From this position, the movement executes a programmed advance always at a constant speed under the control of the program of the controller of the system 20. The step-by-step motor is used in start-stop operation. The new position of the working tool or element 12 is defined at the relative zero of the movement associated with the position selected on the selector 23. The movements are brought one after the other in a programmed sequence, into their position of relative zero. When the last movement in the sequence has reached the position of relative zero, the initialization of the machine is terminated and the working cycle can begin.

2. Working cycle

The beginning of the working cycle of the machine is defined by the switching of the signal of the slot-type initiator 32 from 1 to 0. (The flag 39 leaves the slot of the initiator).

The signal of the initiator is called SYNCHR and defines the absolute zero of the machine.

The working cycle of the machine is directed by the controller of the system. Between two negative edges of the signal SYNCHR, there are 100 pulses of the signal REV. This signifies that the controller of the system recognizes increments of an angle of 3.6° within the cycle of the machine.

The position selected on the program selector 23 defines the angle increments where the operations should be initiated. The controller of the system transmits the parameters of the movement to the input register of the high-speed processor of the movement in question and gives the start pulse.

From this moment on, the movement is entirely controlled by the high-speed processor (PRORAP) of the movement.

The high-speed processor decodes the binary word received from the controller of the system and generates the signal SENS OUT and the pulse train STEP IN for the autonomous control 22 of the step-by-step motor 1. The word received from the controller of the system contains the following data:

7 bits to define the course of the movement, 1 bit to define the direction and 8 bits to define the angle available for the movement in the cycle of the machine.

In the simple version, described here, the kinematics of the movement are fixed. The acceleration and the deceleration are symmetrical. The curve of the speed is exponential. The first 15 intervals are calculated, the speed remains constant afterwards. For this simple version the angle available for the movement is not directly transmitted to the high-speed processor. It is a correction factor with 8 bits which is transmitted, which is pre-calculated in such a manner that the required course is executed over the required angle of the cycle of the machine. The correction factor in this case is represented by two BCD digits and can be programmed from 01 to 99.

In an advanced version, the angle available is directly transmitted to the high-speed processor by 8 binary bits and 4 supplementary bits rendering it possible to select from among the 16 different kinematics, either by changing the mathematical law for the calculation of the intervals, or by varying the angle of acceleration and that of deceleration by distributing the angle available in an asymmetrical manner.

In this description, the simple version is referred to. The kinematics are expressed by 16 binary values stored in the store of the high-speed processor.

The signal used as a clock signal by the high-speed processor is the signal FI, the frequency of which is proportional to the speed of the mechanism 30. An interval calculated between two STEP IN pulses for the step-by-step motor is given by a number of periods of the signal FI determined by one of the 16 stored binary values. The correction factor acts directly on the signal FI by means of a RATE MULTIPLIER with two decades.

3. Monitoring system

The high-speed processor 21 is adapted to detect a possible error in the execution of the movement. A combined system has been realized.

On the one hand the number of steps executed by the motor 1 in the correct direction is counted in an interval which begins with the first STEP IN pulse transmitted to the control of the motor 1 and which ends after a slight lag programmed in relation to the last STEP IN pulse transmitted to the control of the motor. This number is compared with the number of pulses programmed and "ERROR IN EXECUTION" is signalled if the number of steps is less that the number of pulses programmed.

On the other hand, the fact whether the movement has been blocked or not is monitored for each two intervals calculated. If the motor does not execute any step for the two intervals of the program, the signal "BLOCKING OF THE MOVEMENT" is given. If one of the two signals appears, the high-speed processor transmits a request for an interruption to the controller of the system. The controller of the system interprets the request and carries out the corresponding safety routine (for example positioned safety stoppage of the machine).

Figure 4:
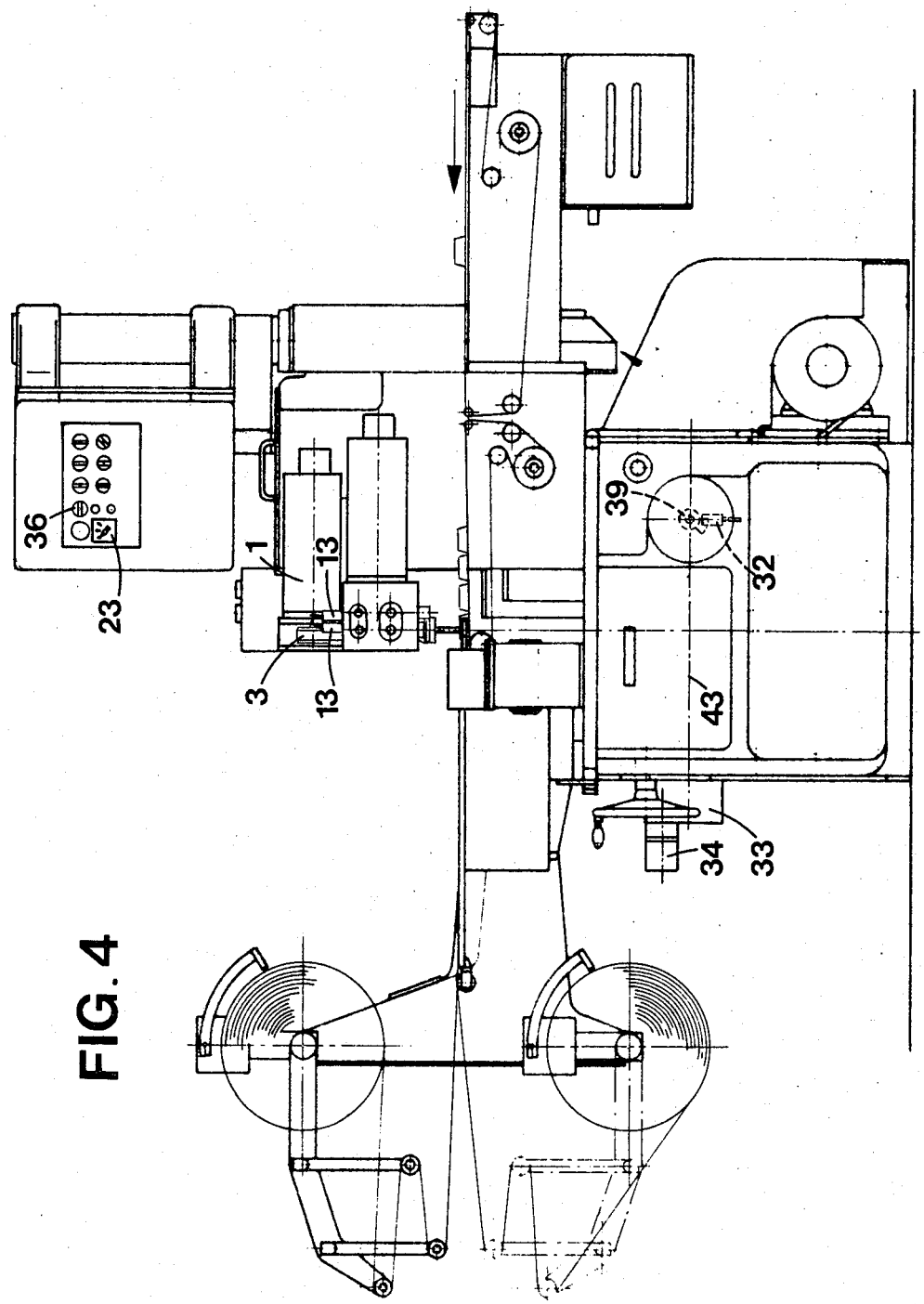
FIGS. 4 and 5 are side and front elevational views of a wrapping machine incorporating the control means illustrated in FIGS. 1 to 3.
Figure 5:
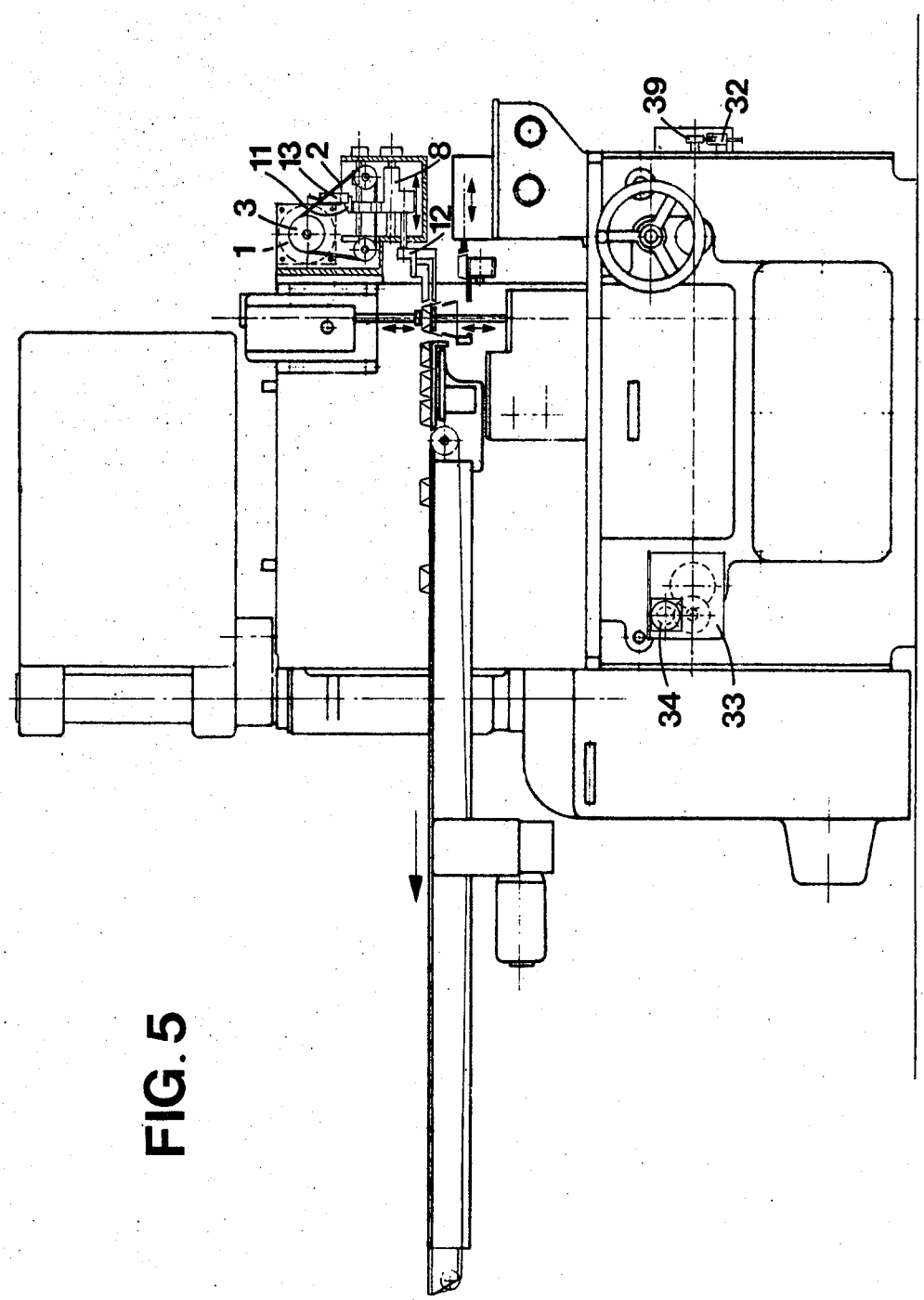

FIGS. 4 and 5 show a hybrid machine. The references relate to elements which have been described above, the other parts are conventional members which are not described for this reason.

I claim:

1. A wrapping machine comprising a plurality of movable elements and control means for controlling the positional movements and movement speed of said elements, wherein said control means comprise a first pulse generator for synchronization, and a control circuit receiving pulses from said pulse generator, said control circuit including a computer, the store of which contains at least one working program, peripherals connected to the computer each comprising a processor controlled by the computer, and step-by-step motor means controlled by the processor and operable to actuate each one of said elements to control both the positional movement and speed of movement of said elements.

2. A machine as claimed in claim 1, including means transmitting said synchronization pulses to each said processor.

3. A machine as claimed in claim 1, including a rotatable main control shaft connected to said pulse generator, wherein said pulse generator is arranged to emit pulses at a frequency proportional to the speed of rotation of said control shaft.

4. A machine as claimed in claim 3, comprising a photo-electric detector co-operating with said pulse generator, wherein said pulse generator comprises a member connected to said control shaft and cooperating with said photo-electric detector in such a manner that said detector produces said pulses.

5. A machine as claimed in claim 3, including a camshaft rigidly connected to said control shaft and controlling some of said movable elements, the other movable elements being controlled by said processors.

6. A machine as claimed in claim 1, comprising a pulse generator, and an internal clock controlling said pulse generator.

7. A machine as claimed in claim 1, wherein at least one of the peripherals comprises a rotary step-by-step motor, a belt driven by said motor and a drive means rigidly connected to said movable element and fixed to said belt to drive said movable element.

8. A machine as claimed in claim 7, wherein at least another one of said step-by-step motors is a linear motor.

9. A machine as claimed in claim 1, including at least one detector, input means of said computer connected to said detector, a part of said movable element co-operating with said detector which transmits to said computer a signal indicating that said element is in a retracted position, whereby said computer can ensure the initiation of operation of said machine.

10. A machine as claimed in claim 3, including a detector, and a member rigidly connected to said shaft and co-operating with said detector, said detector having an output which is connected to an input of said computer to indicate to it whether said shaft is in its zero position.

11. A wrapping machine comprising a plurality of movable elements and control means for controlling the positional movements and movement speed of said elements, wherein said control means comprises a first pulse generator for synchronization, and a control circuit receiving pulses from said pulse generator, said control circuit including a computer, the store of which contains at least one working program, peripherals connected to the computer each comprising a processor controlled by the computer, and step-by-step motor means controlled by the processor and operable to actuate each one of said elements to control both the movement and speed of movement of said elements, said processor being adapted to store, in digital form, a plurality of possible element movements, and said computer being adapted to control an action of said processor by a signal which comprises, in digital form, the selection of said element movements, the indication of the amplitude of said movements, and the portion of the working cycle allocated to the said movements.

12. A wrapping machine comprising a plurality of movable elements and control means for controlling the movements of said elements, wherein said control means comprise a first pulse generator for synchronization, and a control circuit receiving pulses from said pulse generator, said control circuit including a computer, the store of which contains at least one working program, peripherals connected to the computer each comprising a processor controlled by the computer, and step-by-step motor means controlled by the processor and operable to actuate each one of said elements, at least one of said peripherals comprising a second pulse generator driven by said motor and having two phases, said second pulse generator supplying to said processor a plurality of pulses, the number of which pulses is proportional to the number of steps of said motor, said processor being adapted to treat said pulses in a program for monitoring the execution of the movement ordered and, in the case of an error, causing the transmission of a message to said computer, said computer comprising a safety program by means of which it acts on the error message and controls the stoppage of the machine, another safety measure, or the continuation of operation of the machine.

* * * * *